UNITED STATES PATENT OFFICE.

KONRAD DELBRÜCK AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

MANUFACTURE AND PRODUCTION OF A CAOUTCHOUC-LIKE MATERIAL.

1,076,195.  Specification of Letters Patent.  Patented Oct. 21, 1913.

No Drawing.   Application filed December 23, 1912.   Serial No. 738,280.

*To all whom it may concern:*

Be it known that we, KONRAD DELBRÜCK and KURT MEISENBURG, doctors of philosophy, chemists, citizens of the German Empire, residing at Elberfeld, Germany, have invented new and useful Improvements in the Manufacture and Production of a Caoutchouc-like Material, of which the following is a specification.

We have found that the product of autopolymerization of beta - gamma - dimethylerythrene, obtained by allowing the hydrocarbon to stand about one year by itself (Kondakow, *Journal für Praktische Chemie*, vol. 64, pp. 109–110) and which is a whitish, spongy, brittle substance, can be converted by heating, preferably under pressure, into a technically valuable elastic caoutchouc like product which is probably identical to that obtained by heating beta-gamma-dimethylerythrene.

In order to illustrate the new process more fully the following example is given: The product of autopolymerization is heated during 8 hours in a closed iron vessel to from 150–200° C. A compact elastic mass is thus obtained.

We claim:—

1. The process of producing a valuable elastic caoutchouc-like substance, which comprises heating the product of autopolymerization of beta - gamma - dimethylerythrene until the brittleness of such product has been overcome and an elastic substance obtained.

2. The process of producing a valuable elastic caoutchouc-like substance, which comprises heating under pressure the product of autopolymerization of beta - gamma - dimethylerythrene until the brittleness of such product has been overcome and a compact elastic substance obtained.

3. The process of producing a valuable elastic caoutchouc-like substance, which comprises heating to from 150 to 200° C. the product of autopolymerization of beta-gamma-dimethylerythrene until the brittleness of such product has been overcome and an elastic substance obtained.

4. The process of producing a valuable elastic caoutchouc-like substance, which comprises heating under pressure to from 150 to 200° C. the product of autopolymerization of beta-gamma-dimethylerythrene until the brittleness of such product has been overcome and a compact elastic substance obtained.

In testimony whereof we have hereunto set our hands in the presence of two subscribing witnesses.

KONRAD DELBRÜCK. [L. S.]
    KURT MEISENBURG. [L. S.]

Witnesses:
    HELEN NUFER,
    ALBERT NUFER.